United States Patent
Cuenot et al.

(10) Patent No.: US 7,725,041 B2
(45) Date of Patent: May 25, 2010

(54) ALL-OPTICAL INTENSITY TO DPSK CONVERTER

(75) Inventors: Benjamin Cuenot, Dijon (FR); Esther Le Rouzic, Trebeurden (FR); Nicolas Brochier, Ploumagoar (FR)

(73) Assignee: France Telecom SA, Paris (FR)

( * ) Notice: Subject to any disclaimer, the term of this patent is extended or adjusted under 35 U.S.C. 154(b) by 725 days.

(21) Appl. No.: 10/583,228

(22) PCT Filed: Dec. 19, 2003

(86) PCT No.: PCT/FR03/03809

§ 371 (c)(1),
(2), (4) Date: Feb. 28, 2007

(87) PCT Pub. No.: WO2005/069515

PCT Pub. Date: Jul. 28, 2005

(65) Prior Publication Data

US 2007/0223937 A1 Sep. 27, 2007

(51) Int. Cl.
*H04B 10/00* (2006.01)
(52) U.S. Cl. .......................... 398/176; 398/188
(58) Field of Classification Search ............... 398/176, 398/188
See application file for complete search history.

(56) References Cited

U.S. PATENT DOCUMENTS

| 5,466,925 | A | 11/1995 | Hait | |
|---|---|---|---|---|
| 2003/0007216 | A1* | 1/2003 | Chraplyvy et al. | 359/161 |
| 2003/0007231 | A1 | 1/2003 | Winzer | |
| 2003/0210912 | A1* | 11/2003 | Leuthold et al. | 398/188 |
| 2005/0002676 | A1* | 1/2005 | Zitelli | 398/188 |

OTHER PUBLICATIONS

Chikama, T. et al. "Modulation and Demodulation Techniques in Optical Heterodyne PSK Transmission Systems," Journal of Lightwave Technology, 8(3): 309-322, Mar. 1990.

* cited by examiner

*Primary Examiner*—Nathan M Curs
(74) *Attorney, Agent, or Firm*—Gerald E. Helget; Nelson R. Capes; Briggs and Morgan, P.A.

(57) ABSTRACT

An all-optical converter (10) for converting an intensity-modulated optical signal into an optical signal modulated to the DPSK format, includes a first input (152a) for a first intensity-modulated optical signal (12), a differential encoding module (100) adapted to perform a differential encoding between the first signal (12) and a second optical signal synchronous with the first signal (12), a device adapted to modulate (200) the phase of an optical signal (16) according to the differential encoding performed by the differential encoding module (100), and an output (162c) of the device adapted to modulate (200) delivering an optical signal modulated to the DPSK format (14).

12 Claims, 1 Drawing Sheet

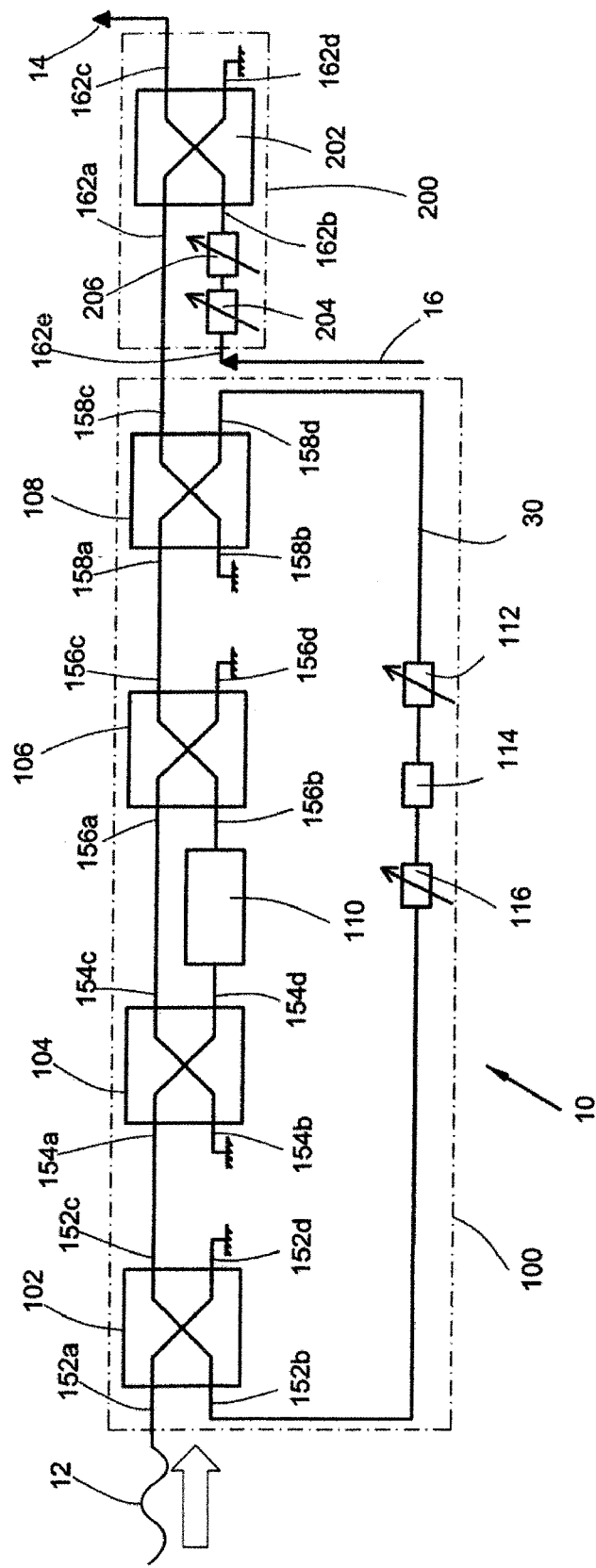
Single Figure

ALL-OPTICAL INTENSITY TO DPSK CONVERTER

CROSS-REFERENCE TO RELATED APPLICATION

The present application is a national stage of and claims priority of International Patent Application Serial No. PCT/FR2003/03809, filed Dec. 19, 2003, the content of which is hereby incorporated by reference in its entirety.

BACKGROUND OF THE INVENTION

The invention concerns an all-optical converter for converting an intensity-modulated optical signal into an optical signal modulated to the DPSK format. It finds an application in the field of optical transmissions.

Intensity modulation by On/Off Keying or OOK is known. In this case, a pulse represents a "1" and an absence of pulse represents a "0".

Differential phase shift modulation (Differential Phase Shift Keying or DPSK) is known. In the DPSK format, the information is transported in the phase difference between two adjacent pulses.

Transmission to the DPSK format is advantageous since the sensitivity is better. In addition in optical mode, it is easy to analyse the phase difference between two signals.

There currently exist, in the field of optical transmissions, converters that convert an amplitude-coded binary electrical signal into an optical signal coded to the DPSK format. These converters combine electronic elements and optical elements.

The electronic part of the converter comprises an exclusive-OR (XOR) electronic logic gate. The electronic signal that represents the information arrives modulated in amplitude at the first input of the logic gate. The output of the logic gate is connected to the second input of the logic gate with a delay of one bit time with respect to the first input.

In a particular case, an optical signal serving as a carrier is sent into an optoelectronic modulator, for example of the Mach-Zender type. This modulator is controlled by the electrical signal issuing from the output of the logic gate and effects a modulation so that a state of the electrical signal equal to "1" is associated with a phase difference of .pi. of the optical signal.

These converters, which combine electronics and optics, are very expensive for frequencies above 20 GHz and are non-existent for frequencies above 40 GHz.

The problem is therefore to produce an all-optical converter for converting an intensity-modulated optical signal into an optical signal modulated to the DPSK format.

The invention is not limited to certain frequencies and can apply to the entire spectrum.

Hereinafter 2 to 2 or 50:50 couplers will be referred to as 3 dB couplers.

Hereinafter it will be said that an output of a component is not connected if the signal that is delivered on this output is entirely absorbed, not interfering with the signals upstream or downstream. It will be said that an input of a component is not supplied if the amplitude of the signal that it receives is zero.

One object of the present invention is to propose a converter that does not have the drawbacks of the prior art.

BRIEF SUMMARY OF THE INVENTION

To this end, an all-optical converter for converting an optical signal modulated In intensity into an optical signal modulated to the DPSK format is proposed. This all-optical converter is characterised in that it comprises: a first input for a first intensity-modulated optical signal; a differential encoding module adapted to carry out a differential encoding between the first signal and a second optical signal synchronous with the first signal; a device adapted to modulate the phase of an optical signal according to the differential encodings performed by the differential encoding module; an output of the device adapted to modulate delivering an optical signal modulated to the DPSK format.

Advantageously, the differential encoding module performs the differential encoding using an exclusive-OR function and a feedback loop.

Advantageously, in order to implement the exclusive-OR function, the differential encoding module comprises: a first optical coupler whose first input is supplied with the first signal, whose second input is supplied with the second signal and whose second output is not connected; a second optical coupler whose first input is supplied by the first output of the first coupler, whose second input is not supplied; an absorbing non-linear device whose input is supplied by the second output of the second coupler; and a third optical coupler whose first input is supplied by the first output of the second coupler, whose second input is supplied by the output of the absorbing non-linear device, whose second output is not connected and whose first output delivers the signal representing the result of the exclusive-OR function.

Advantageously, the differential encoding module comprises a fourth optical coupler whose first input is supplied by the first output of the third coupler, whose second input is not supplied, whose first output supplies the device adapted to modulate and whose second output supplies the feedback loop.

Advantageously, the second synchronous optical signal is delivered by the feedback loop.

Advantageously, the feedback loop comprises an optical phase-shift device and an optical amplifier.

Advantageously, the feedback loop also comprises a tuneable optical delay device adapted to delay the second signal with respect to the first signal with an integer number of bit times.

Advantageously, the device adapted to modulate comprises a coupler whose first input is supplied by the signal encoded by the differential encoding module, whose second input is supplied by a signal out-of-phase by $$\frac{\pi}{2}$$

with respect to the encoded signal, whose second output is not connected and whose first output delivers an optical signal modulated to the DPSK format.

Advantageously, the device adapted to modulate comprises, upstream of its second input, a tuneable optical delay device adapted to delay the out-of-phase signal with respect to the encoded signal with an integer number of bit times.

Advantageously, the phase of the optical signal modulated to the DPSK format varies from zero to $\pi$ according to the result of the exclusive-OR function.

Advantageously, the optical couplers are 3 dB optical couplers.

Advantageously, the first signal has an amplitude of $E_0$ and the second signal has an amplitude of $E_0$ and phase difference of $$\frac{\pi}{2}$$

with respect to the first signal; the optical amplifier has a gain of 12.04 dB; the absorbing non-linear device has a threshold slightly greater than $\alpha^2 . E_0$ with $$\alpha = \frac{\sqrt{2}}{2};$$

the signal supplying the second input of the coupler of the device adapted to modulate has an amplitude of $$\frac{\alpha^4}{2} \cdot E_0$$

and a phase shift of $$\frac{\pi}{2}$$

with respect to the signal supplying the first input of the fifth coupler of the device adapted to modulate.

BRIEF DESCRIPTION OF THE DRAWINGS

The characteristics of the invention mentioned above, as well as others, will emerge more clearly from a reading of the following description of an example embodiment, the said description being given in relation to the single FIGURE, which represents a converter according to the invention.

DETAILED DESCRIPTION OF THE INVENTION

The single FIGURE depicts an all-optical converter 10 that performs the conversion of an intensity-modulated optical signal into an optical signal modulated to the DPSK format.

The converter 10 comprises a first input 152a, onto which a first optical signal 12 is injected. The optical signal 12 represents a data sequence and is modulated in intensity according to an OOK format. This optical signal may have been generated from an electrical signal and an optoelectronic modulator that transforms the OOK-modulated electrical signal into an OOK-modulated optical signal.

The converter 10 comprises a second input 162e, onto which there is injected an optical carrier 16 (continuous or not) that is then modulated to the DPSK format.

The converter 10 comprises a first output 162c on which an optical signal 14 modulated to the DPSK format is delivered.

The converter 10 thus carries out the all-optical conversion of an intensity-modulated optical signal into an optical signal modulated to the DPSK format.

The converter 10 comprises a differential encoding module 100 and a device adapted to modulate 200.

The device adapted to modulate 200 is provided with a first input 162a that is connected to the output of the differential encoding module 100 and on which the signal encoded by the differential encoding module 100 is received. The device adapted to modulate 200 is provided with the second input 162e on which the carrier 16 is injected. The device adapted to modulate 200 is also provided with the first output 162c. The first output 162c of the converter 10 delivers the optical signal 14 modulated to the DPSK format. The device adapted to modulate 200 modulates the phase of the optical signal 16 according to the differential encoding carried out by the differential encoding module 100.

The device adapted to modulate 200 comprises a coupler 202 that will be numbered the fifth coupler 202, a phase shift device 204 and a tuneable optical delay device 206.

The fifth coupler 202 comprises the first input 162a and a second input 162b. The fifth coupler 202 also comprises the first output 162c and an unconnected second output 162d.

The phase shift device 204 and the tuneable optical delay device 206 are connected in series between the second input 162e and the second input 162b.

The phase shift device 204, which may be tuneable, is fitted in order to ensure a certain phase shift between the signal present on the first input 162a and the signal present on the second input 162b.

The tuneable optical delay device 206 allows the synchronisation of the bits of the signals of the two inputs 162a and 162b of the fifth coupler 202. In particular, the optical delay device 206 is adjusted so as to have an integer number of delay bit times. As will be seen later this delay device 206 is not always necessary.

The differential encoding module 100 comprises the first input 152a and a first output 158c that is connected to the first input 162a of the device adapted to modulate 200 and that delivers the encoded signal.

The structure of the differential encoding module 100 will now be described.

The differential encoding module 100 comprises four optical couplers 102, 104, 106 and 108, an absorbing non-linear device 110 and a feedback loop 30.

The first coupler 102 comprises the first input 152a that is supplied with the first signal 12 and a second input 152b that is supplied with a second optical signal synchronous with the first signal 12 and delivered for example by the feedback loop 30. The first coupler 102 also comprises a first output 152c and a second output 152d that is not connected.

The second optical coupler 104 comprises a first input 154a supplied by the first output 152c of the first coupler 102, and a second input 154b that is not supplied. The second optical coupler 104 also comprises a first output 154c and a second output 154d.

The absorbing non-linear device 110 makes it possible to absorb any electromagnetic field whose amplitude is less than or equal to a threshold value and to transmit any electromagnetic field whose amplitude is above the threshold value. The absorbing non-linear device 110 can be of the saturable absorbing type or a non-linear optical loop. The absorbing non-linear device 110 comprises an input that is supplied by the second output 154d of the second coupler 104.

The third optical coupler 106 comprises a first input 156a that is supplied by the first output 154c of the second coupler 104 and a second input 156b that is supplied by the output of the absorbing non-linear device. 110. The third optical coupler 106 also comprises a first output 156c and a second output 156d that is not connected.

The fourth optical coupler 108 comprises a first input 158a that is supplied by the first output 156c of the third coupler 106 and a second input 158b that is not supplied. The fourth optical coupler 108 also comprises a first output 158c that supplies the device adapted to modulate 200 and a second output 158d that supplies the feedback loop 30.

The feedback loop 30 comprises an optical phase shift device 112, an optical amplifier 114 and a tuneable optical delay device 116 adapted to delay the second signal present at the second input 152b of the first coupler 102 with respect to the first signal 12 with an integer number of bit times.

The differential encoding module 100 performs the differential encoding of the data sequence in an all-optical manner from the first optical signal 12 present at the first input 152a and the second optical signal, synchronous with the first, present at the second input 152b of the first coupler 102.

The differential encoding module 100 implements amongst other things an exclusive-OR function between the optical signals present at the inputs 152a and 152b, by virtue of the combination of the first coupler 102, the second coupler 10d, the third coupler 106 and the absorbing non-linear device 110. The signal present at the first output 156c of the third coupler 106 represents the exclusive-OR logic function between the optical signals present at the inputs 152a and 152b.

Each element 102, 104, 106, 108 and 202 is a 3 dB optical coupler. The optical signals coming from the couplers also satisfy the following matrix equation.

$$\begin{pmatrix} S_1 \\ S_2 \end{pmatrix} = \begin{pmatrix} \alpha & \alpha \cdot e^{i\frac{\pi}{2}} \\ \alpha \cdot e^{i\frac{\pi}{2}} & \alpha \end{pmatrix} \cdot \begin{pmatrix} E_1 \\ E_2 \end{pmatrix} \quad (1)$$

in which $E_1$ and $E_2$ are the electromagnetic fields present at the first and second inputs of the coupler, $S_1$ and $S_2$ are the electromagnetic fields present at the first and second outputs of the coupler and where $$\alpha = \frac{\sqrt{2}}{2}.$$

The original signal 12 present on the first input 152a is an electromagnetic field having an amplitude equal to $E_0$ or zero.

The optical signal present on the second input 152b is an electromagnetic field assumed to have an amplitude equal to $E_0$ or zero and, when its amplitude is equal to $E_0$, a phase shift of $$-\frac{\pi}{2}$$

with respect to the optical signal present on the first input 152a.

The threshold value of the absorbing non-linear device 110 will here be chosen so as to be slightly greater than $\alpha^2 E_0$, so as to transmit any electromagnetic field whose amplitude is greater than $\alpha^2 \cdot E_0$. As will be seen below the threshold value is chosen so as to allow the transmission of the fields whose amplitude is equal to $2\alpha^2 \cdot E_0$ and absorb the fields whose amplitude is zero or equal to $\alpha^2 \cdot E_0$.

The functioning of the differential encoding module 100 will now be studied.

The first coupler 102 performs the coupling of the inputs 152a and 152b and delivers the optical signal thus coupled on the first output 152c. The optical signal present at the first output 152c corresponds to $S_1$ in, equation (1).

The following table summarises the possible values of the amplitude and phase of the signal present at the first output 152c according to the amplitudes of the signals present at the inputs 152a and 152b, namely the first signal 12 and the second signal present at the second input 152b of the first coupler 102 and which correspond to $E_1$ and $E_2$ in equation (1).

| $|E1|$ | $|E2|$ | $|S_1|$ | $\varphi_{s1}$ | |
|---|---|---|---|---|
| 0 | 0 | 0 | X | (2) |
| $E_0$ | 0 | $\alpha \cdot E_0$ | 0 | |
| 0 | $E_0$ | $\alpha \cdot E_0$ | 0 | |
| $E_0$ | $E_0$ | $2\alpha \cdot E_0$ | 0 | |

The phase of the signal at the first output 152c is constant and equal to the phase of the signal present at the first input 152a if the output signal is non-zero. The phase of the signal does not have any meaning in the case where the output signal is zero.

The signal present at the first output 152c is injected onto the first input 154a of the second coupler 104. The signal present on the first input 154a of the second coupler 104 is then represented by $E_1$ in equation (1). The signals present on the outputs 154c and 154d of the second coupler 104 fulfil the roles of $S_1$ and $S_2$ in equation (1). A table similar to (2) can be written for the second coupler 104 according to the values of the amplitude of the signal present at the first input 154a.

This then gives:

| | | | | | (3) |
|---|---|---|---|---|---|
| $|E1|$ | $|E2|$ | $|S_1|$ | $|S_2|$ | $\psi_{s1}$ | $\psi_{s2}$ |
| 0 | 0 | 0 | 0 | X | X |
| $\alpha \cdot E_0$ | 0 | $\alpha^2 \cdot E_0$ | $\alpha^2 \cdot E_0$ | 0 | $\frac{\pi}{2}$ |
| $\alpha \cdot E_0$ | 0 | $\alpha^2 \cdot E_0$ | $\alpha^2 \cdot E_0$ | 0 | $\frac{\pi}{2}$ |
| $2\alpha \cdot E_0$ | 0 | $2\alpha^2 \cdot E_0$ | $\alpha^2 \cdot E_0$ | 0 | $\frac{\pi}{2}$ |

The signal issuing from the second output 154d of the second coupler 104 is directed towards the input of the absorbing non-linear device 110. In the light of the value assigned to the threshold value, the amplitude of the signal 156b output from the component 110 is equal to zero or $2\alpha^2 \cdot E_0$. This is because, the threshold value being fixed slightly greater than $\alpha^2 \cdot E_0$, only the signals whose amplitude is equal to $2\alpha^2 \cdot E_0$ are transmitted.

A table similar to table (3) can be written for the third coupler 106, whose signal at the first input 156a is the same as that of the first output 154c of the second coupler 104 and whose signal at the second input 156b is the same as that of the output of the absorbing non-linear device 110. The signal at the first output 156c is represented by $S_1$ in equation (1).

|             |             |             | (4)         |
|-------------|-------------|-------------|-------------|
| \|E1\|      | \|E2\|      | \|S1\|      | $\phi_{S1}$ |
| 0           | 0           | 0           | X           |
| $\alpha^2 \cdot E_0$ | 0 | $\alpha^3 \cdot E_0$ | 0 |
| $\alpha^2 \cdot E_0$ | 0 | $\alpha^3 \cdot E_0$ | 0 |
| $2\alpha^2 \cdot E_0$ | $2\alpha^2 \cdot E_0$ | 0 | 0 |

The first output 156c of the third coupler 106 then delivers a signal representing the result of the exclusive-OR function. An exclusive-OR function between the signals present at the input 152a and 152b was then implemented by virtue of the three couplers 102, 104 and 106 and the absorbing non-linear device 110. In addition the output phase is constant so that it is not necessary to check it.

In order to implement the feedback loop 30 and to supply the device adapted to modulate 200, the signal present at the first output 156c of the third coupler 106 must be sent both to the first input 162a of the device adapted to modulate 200 and to the feedback loop 30. For this purpose the fourth coupler 108 is used following the third coupler 106. The advantage is that such a means is a simple means of separating the signal. The function of the fourth coupler 108 is to separate the signal in order to supply the device adapted to modulate 200 and the feedback loop 30.

The signal present at the first output 156c of the third coupler 106 is sent to the first input 158a of the fourth coupler 108. A table similar to table (4) can be written for the fourth coupler 108. The signals $S_1$ and $S_2$ then represent the signals present at the outputs 158c and 158d.

|             |             |             |             |             | (5)         |
|-------------|-------------|-------------|-------------|-------------|-------------|
| \|E1\|      | \|E2\|      | \|S1\|      | \|S2\|      | $\phi_{s2}$ | $\phi_{s2}$ |
| 0           | 0           | 0           | 0           | X           | X           |
| $\alpha^3 \cdot E_0$ | 0 | $\alpha^4 \cdot E_0$ | $\alpha^4 \cdot E_0$ | 0 | $\frac{\pi}{2}$ |
| $\alpha^3 \cdot E_0$ | 0 | $\alpha^4 \cdot E_0$ | $\alpha^4 \cdot E_0$ | 0 | $\frac{\pi}{2}$ |
| 0           | 0           | 0           | 0           | 0           | X           |

The field at the first output 158c supplies the device adapted to modulate 200 and is written, when it is not zero: $E = \alpha^4 \cdot E_0$ (6).

The field at the second output 158d supplies the feedback loop 30 and is written, when it is not zero:

$$E = \alpha^4 \cdot E_0 \cdot e^{i\frac{\pi}{2}}. \quad (7)$$

The field at the output 158d is then used to generate the field present at the second input 152b of the differential encoding module 100.

On the first coupler 102, it has been assumed that the field present at the second input 152b had amplitude $E_0$ and a phase shift of $$-\frac{\pi}{2}$$

with respect to the field present at the first input 152a.

In order to obtain this result from the field present at the second output 158d of the fourth coupler 108, an optical phase shift device 112 is put in place. The phase shift device 112 causes a phase shift of π, which has the effect of bringing back the phase to $$-\frac{\pi}{2}.$$

Theoretically the phase shift of the signal issuing from the second output 158d of the fourth coupler 108 is .pi. 2 but the various components can introduce parasitic phase shifts and it is therefore advantageous to provide a tuneable phase shift device 112 in order to effectively bring back the phase to $$-\frac{\pi}{2}.$$

An optical amplifier 114 with a 12.04 dB gain brings back the amplitude of the output field of the amplifier 114 to $E_0$ or to zero.

There is then a field of amplitude $E_0$ and out of phase by $$-\frac{\pi}{2}$$

with respect to the field present at the first input 152a.

A tuneable optical delay device 116 is put in place in order to synchronise with each other the bits of the signals of the two inputs 152a and 152b. In particular, the optical delay device 116 is adjusted so as to have an integer number of delay bit times.

The differential encoding module 100 does indeed perform a differential encoding between the two input signals 152a and 152b, the second output 158d looping back onto the second input 152b in order to implement a feedback loop.

The device adapted to modulate 200 is supplied by its second input 162e with the optical signal 16, whose electromagnetic field has amplitude of $$\frac{\alpha^4}{2} \cdot E_0$$

and a constant phase of π.

The phase shift device 204 is put in place in order to provide a phase shift of π/2 with respect to the phase of the signal of the first input 162a. As with the phase shift device 112, this new phase shift device may be tuneable in order to guarantee the phase difference of between the two signals.

What is important is that the signal present at the second input 162b of the fifth coupler 202 be out of phase by $$\frac{\pi}{2}$$

with respect to the encoded signal present at the first input 162a of the device adapted to modulate 200.

A table similar to table (5) can be written. The signals $E_1$ and $E_2$ are corresponding to the signals of the inputs 162a and 162b, the signal $S_1$ corresponding to the signal of the output 162c.

(6)

| $|E1|$ | $|E2|$ | $|S1|$ | $\phi_{S1}$ |
|---|---|---|---|
| 0 | $\frac{\alpha^4}{2}\cdot E_0$ | $\frac{\alpha^5}{2}\cdot E_0$ | $\pi$ |
| $\alpha^4 \cdot E_0$ | $\frac{\alpha^4}{2}\cdot E_0$ | $\frac{\alpha^5}{2}\cdot E_0$ | 0 |

The output field therefore has constant amplitude, and the signal is therefore not modulated in intensity. On the other hand its phase varies and has a phase shift of π according to the result of the exclusive-OR logic function between the inputs 152a and 152b of the differential encoding module 100. The information is coded in the phase difference, the signal delivered by the first output 162c is therefore a signal 14 modulated to the DPSK format.

The tuneable optical delay device 206 allows the synchronisation of the bits of the signals of the two inputs 162a and 162b of the fifth coupler 202. In particular, the optical delay device 206 is adjusted so as to have an integer number of delay bit times.

The optical delay device 206 is not necessary when the signal emitted at the output 162c is in an NRZ-DPSK (Non-Return-to-Zero-DPSK) format since the carrier 16 is then a continuous wave.

The optical delay device 206 is necessary when the signal emitted at the output 162c is in an RZ-DPSK (Return-to-Zero-DPSK) format since the carrier 16 is then a modulated wave and synchronisation between the signals is necessary.

Naturally the present invention not limited to the examples and embodiments described and depicted but is capable of many variants accessible to a person skilled in the art.

For example, the numerical values of the components are given by way of example in the case of perfect components that generate no loss, and these values must be adapted to make it possible to adjust the actual values of the amplitudes of the signals to the theoretical values.

The invention claimed is:

1. An all-optical converter for converting an optical signal modulated in intensity into an optical signal modulated in DPSK format, wherein said all-optical converter comprises:
   (a) a first input for inputting a first intensity-modulated optical signal;
   (b) a differential encoding module adapted to perform a differential encoding between the first signal and a second optical signal synchronous with the first signal;
   (c) a device adapted to modulate the phase of an optical signal according to the differential encoding performed by the differential encoding module; and
   (d) an output of the device adapted to modulate delivering an optical signal modulated in DPSK format.

2. The all-optical converter according to claim 1, wherein the differential encoding module performs the differential encoding using an exclusive-OR function and a feedback loop.

3. The all-optical converter according to claim 2, wherein, in order to implement the exclusive-OR function, the differential encoding module comprises:
   (a) a first optical coupler whose first input is supplied with the first signal, whose second input is supplied with the second signal and whose second output is not connected;
   (b) a second optical coupler whose first input is supplied by a first output of the first coupler, and whose second input is not supplied;
   (c) an absorbing non-linear device whose input is supplied by a second output of the second coupler; and
   (d) a third optical coupler whose first input is supplied by a first output of the second coupler, whose second input is supplied by the output of the absorbing non-linear device, whose second output is not connected and whose first output delivers the signal representing the result of the exclusive-OR function.

4. The all-optical converter according to claim 3, wherein the differential encoding module comprises a fourth optical coupler whose first input is supplied by the first output of the third coupler, whose second input is not supplied, whose first output supplies the device adapted to modulate and whose second output supplies the feedback loop.

5. The all-optical converter according to claim 4, wherein the second synchronous optical signal is delivered by the feedback loop.

6. The all-optical converter according to claim 5, wherein the feedback loop comprises an optical phase shift device and an optical amplifier.

7. The all-optical converter according to claim 6, wherein the feedback loop also comprises a tuneable optical delay device adapted to delay the second signal with respect to the first signal with an integer number of bit times.

8. The all-optical converter according to claim 7, wherein the device adapted to modulate comprises a coupler whose first input is supplied by the signal encoded by the differential encoding module, whose second input is supplied by a signal out of phase by $$\frac{\pi}{2}$$

with respect to the encoded signal, whose second output is not connected and whose first output delivers an optical signal modulated in DPSK format.

9. The all-optical converter according to claim 8, wherein the device adapted to modulate comprises, upstream of its second input, a tuneable optical delay device adapted to delay the out-of-phase signal with respect to the encoded signal with an integer number of bit times.

10. The all-optical converter according to claim 8, wherein the phase of the optical signal modulated in DPSK format varies from zero to $\pi$ according to the result of the exclusive-OR function.

11. The all-optical converter according to claim 8, wherein said couplers are 3 dB optical couplers.

12. The all-optical converter according to claim 8, wherein the first signal has an amplitude of $E_0$ and the second signal has an amplitude of $E_0$ and a phase difference of $$-\frac{\pi}{2}$$

with respect to the first signal; and wherein an optical amplifier, comprised in said all-optical converter, has a gain of 12.04 dB; and wherein the absorbing non-linear device comprised in said all-optical converter, has a threshold slightly greater than $\alpha^2.E_0$ with $$\alpha = \frac{\sqrt{2}}{2};$$

in that a signal supplying the second input of the coupler of the device adapted to modulate has an amplitude of $$\frac{\alpha^4}{2}.$$

$E_0$ and a phase shift of $$\frac{\pi}{2}$$

with respect to a signal supplying the first input of the coupler of the device adapted to modulate.

* * * * *